United States Patent [19]
Kuster et al.

[11] Patent Number: 5,490,874
[45] Date of Patent: Feb. 13, 1996

[54] DE-AERATOR APPARATUS

[75] Inventors: Hans L. Kuster, Barrington; Benno Lebkuchner, Warwick, both of R.I.

[73] Assignee: Sparco, Inc., Warwick, R.I.

[21] Appl. No.: 367,578

[22] Filed: Jan. 3, 1995

[51] Int. Cl.$^6$ .................................................. B01D 19/00
[52] U.S. Cl. ................... 96/204; 95/260; 96/165; 96/206
[58] Field of Search ...................... 96/204, 165, 206–210, 96/213, 216, 219, 220, 179; 261/75, DIG. 26; 95/260–262; 366/336–339

[56] References Cited

U.S. PATENT DOCUMENTS

| | | | |
|---|---|---|---|
| 1,982,884 | 12/1934 | Schroder et al. | 261/75 |
| 2,710,664 | 6/1955 | Blackmore et al. | 96/210 X |
| 3,151,961 | 10/1964 | Blackmore et al. | 96/219 X |
| 3,486,306 | 12/1969 | Blackmore et al. | 96/210 |
| 3,854,906 | 12/1974 | Roffelsen | 96/167 |
| 4,027,691 | 6/1977 | Roffelsen | 137/202 |
| 4,381,928 | 5/1983 | Roffelsen | 96/165 |
| 4,456,172 | 6/1984 | Roffelsen | 237/66 |
| 4,645,518 | 2/1987 | Roffelsen | 55/409 X |
| 4,718,922 | 1/1988 | Roffelsen | 95/266 |
| 4,919,802 | 4/1990 | Katsura | 96/209 X |
| 4,993,599 | 2/1991 | Gruenewald | 366/336 X |

*Primary Examiner*—Richard L. Chiesa
*Attorney, Agent, or Firm*—Salter & Michaelson

[57] ABSTRACT

A de-aerator apparatus for removing gas from fluid flowing through a pipe includes a housing having a chamber, an inlet connected to an inlet pipe for allowing the passage of fluid into the chamber, an outlet connected to an outlet pipe for discharging fluid from the chamber, and a vent for venting gas from the top of the chamber. The arrangement is such that as fluid flows into the chamber through the inlet and out of the chamber through the outlet, relatively large gas pockets present in the fluid in the chamber rise to the surface of the fluid and exit the chamber through the vent. A device disposed within the chamber has bristles facing the flow of fluid into the chamber through the inlet. The bristles vibrate for merging micro gas pockets present in the fluid with one another to produce large gas pockets which rise to the surface of the fluid within the chamber and exit the chamber through the vent.

14 Claims, 3 Drawing Sheets

5,490,874

DE-AERATOR APPARATUS

BACKGROUND AND SUMMARY OF THE INVENTION

This invention relates generally to apparatus for removing gas from pipes, and more specifically to a de-aerator apparatus for removing gas from fluid flowing through a pipe of a closed heating and/or cooling system, or an open water distribution system.

In open or closed systems, corrosion of the system's components takes place due to air containing oxygen present in the system. Also, air present in the water creates erratic pumping performance, vibrating noise (e.g., knocking) and other undesirable effects.

This invention is in the same general field as apparatus for de-aeration of liquid flowing in systems disclosed in U.S. Pat. Nos. 3,854,906, 4,027,691, 4,381,928, 4,456,172, 4,645,518 and 4,718,922. Such apparatus, which are commonly referred to in the art as "de-aerators", are typically complicated in their construction, requiring many parts and extensive, labor-intensive assembly. Moreover, many of these apparatuses do not substantially eliminate all of the gas present in the liquid.

Accordingly, among the several objects of the present invention are the provision of a de-aerator apparatus which substantially eliminates gas from liquid flowing through a system; the provision of such an apparatus which substantially prevents corrosion of components in a system by removing air pockets containing oxygen; the provision of such an apparatus having a chamber of a housing which is accessible for cleaning; the provision of such an apparatus which is simple in design, economical to manufacture, and easy to assemble.

In general, a de-aerator apparatus for removing gas from fluid flowing through a pipe of the present invention comprises a housing having a chamber, an inlet connected to an inlet pipe for allowing the passage of fluid into the chamber, an outlet connected to an outlet pipe for discharging fluid from the chamber, and a vent for venting gas from the top of the chamber. The arrangement is such that as fluid flows into the chamber through the inlet and out of the chamber through the outlet, relatively large gas pockets present in the fluid in the chamber are adapted to rise to the surface of the fluid and exit the chamber through the vent. A device disposed within the chamber has bristles facing the flow of fluid into the chamber through the inlet. The bristles vibrate for merging micro gas pockets present in the fluid with other micro gas pockets for forming large gas pockets which rise to the surface of the fluid within the chamber and exit the chamber through the vent.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

Corresponding reference numerals designate corresponding parts throughout the several views of the drawings.

DETAILED DESCRIPTION OF THE PREFERRED EMBODIMENTS

In opened or closed heating and/or cooling systems having water as its fluid medium, it is desirable to remove air pockets from the system which contain oxygen, since oxygen corrodes the metal components of the system. Also, air pockets disturb the constant flow of water through such a system thereby creating erratic pumping performance, noise vibrations (knocking) and other undesirable effects.

Figure 1:
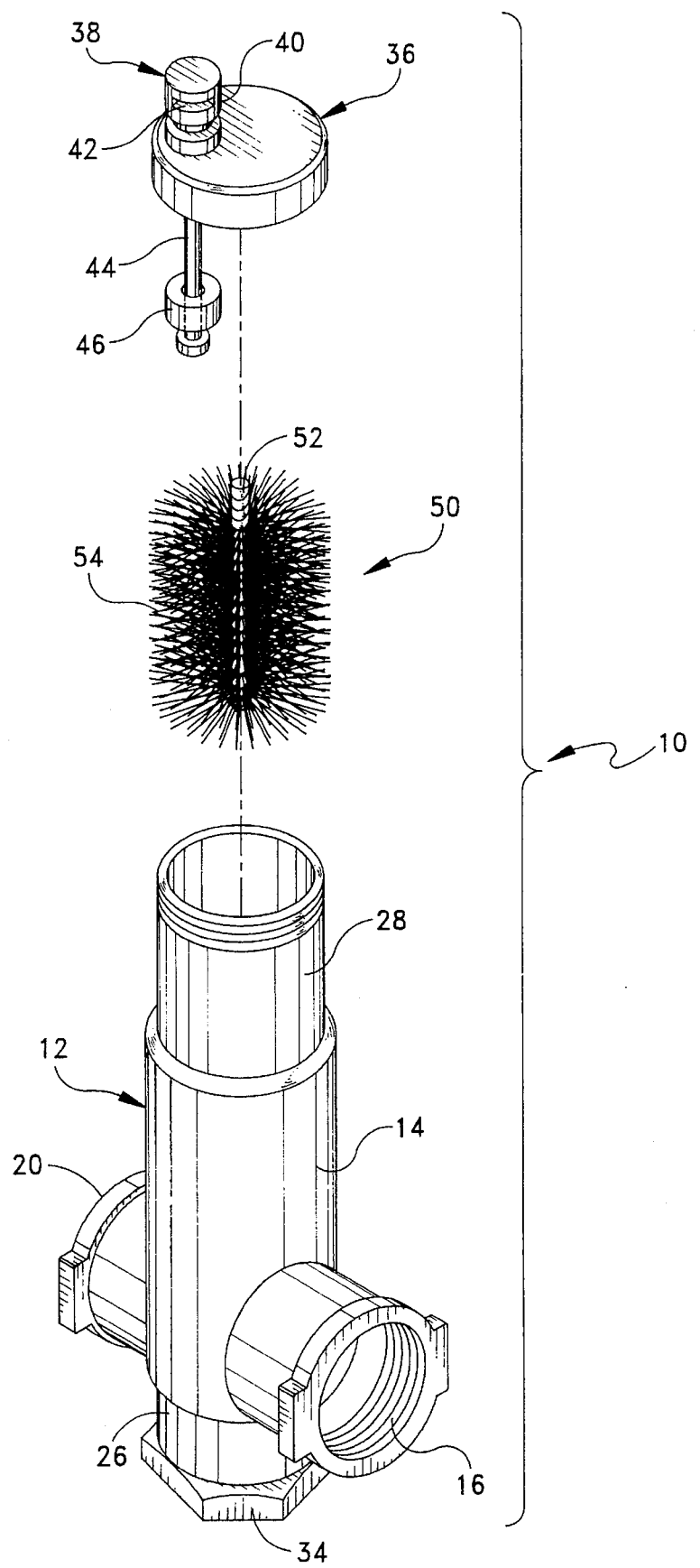
FIG. 1 is a an exploded perspective view of the de-aerator apparatus of the present invention illustrating a first preferred embodiment.
Figure 2:
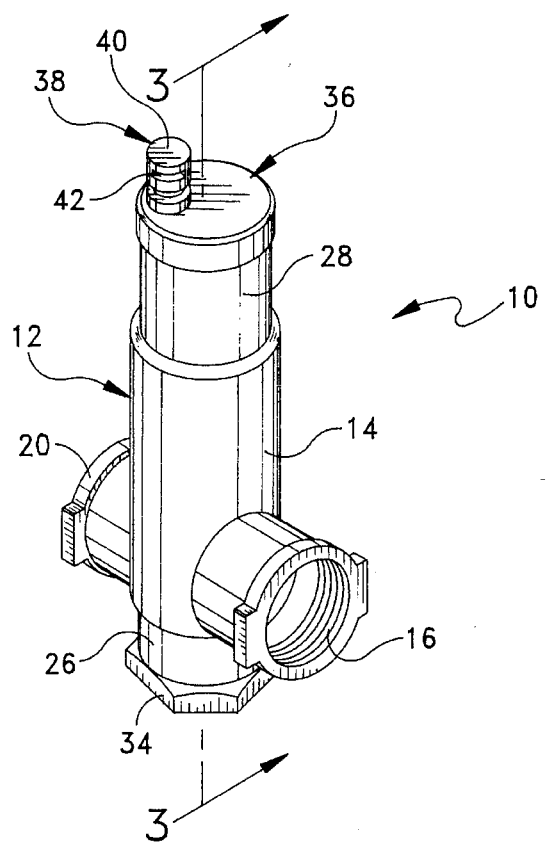
FIG. 2 is a perspective view of the de-aerator apparatus illustrated in FIG. 1 in assembled forum.
Figure 3:
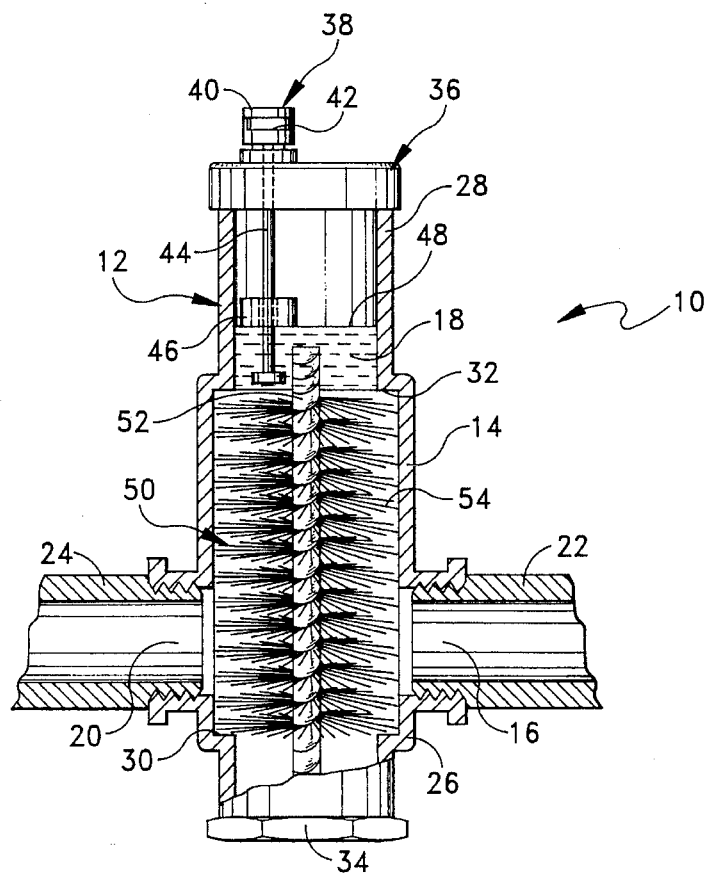
FIG. 3 is a cross-sectional view taken along line 3—3 of FIG. 2.

Referring now to the drawings, and more particularly to FIG. 1–3, there is generally indicated at 10 a de-aerator apparatus of a first preferred embodiment for removing gas from fluid flowing through a pipe. As shown, the de-aerator apparatus 10 comprises a housing, generally indicated at 12, having a cylindrical wall 14 preferably fabricated from bronze or stainless steel. Formed in the wall 14 is an inlet 16 for allowing the passage of fluid into a chamber 18 (FIG. 3) of the housing 12 and an outlet 20 for discharging fluid from the chamber 18. The inlet and outlet 16, 20 are internally threaded for receiving an inlet pipe 22 and an outlet pipe 24, respectively, of a closed heating and/or cooling system (not shown) having fluid, e.g., water, flowing therethrough. The cylindrical wall 14 of the housing 20 extends in a direction generally transverse to the direction of flow of fluid between the inlet and the outlet 16, 20.

The cylindrical wall 14 of the housing 12 includes a pair of reduced diameter portions 26, 28 at the upper and lower ends of the housing 12. The lower reduced diameter portion 26 defines a lower (first) seat indicated at 30 and the upper reduced diameter portion defines an upper (second) seat indicated at 32. As shown, seats 30, 32 are formed in the cylindrical wall 14 around the circumference of the wall. A bottom wall or plug 34 removably attached to the cylindrical wall 14 seals the bottom of the housing 12, the bottom plug 34 having an outer surface the shape of a hexagon for threadably attaching the plug to the housing with a tool, such as a pipe wrench. The plug 34 may be removed for accessing and cleaning the chamber 18 of the housing 12.

The upper end of the housing 12 is externally threaded for receiving a cap, generally indicated at 36, for sealing the open top of the housing 12. The cap 36 includes a vent for venting gas (e.g., air) from the chamber. As illustrated in FIG. 3, the vent embodies a valve, generally indicated at 38, having a fitting 40 which releasably fastens to the cap 36, the fitting 40 having an opening 42 formed therein for venting gas from the chamber 18. The valve 38 is provided for controlling the amount of gas present in the chamber 18 and thus the level of fluid present in the chamber. A valve member (not shown) is provided for selectively blocking the opening 42 of the fitting. Controlling the movement of the valve member is a needle and float 46 arrangement of conventional construction. The float 46 is slidably mounted for up-and-down movement on the needle 44. The arrangement is such that as the float 46 rises within the chamber 18, the valve 38 closes to prevent gas from escaping from the chamber 18. This results in an increased amount of gas captured within the chamber 18 thereby dropping the level of fluid in the chamber 18. As the float 46 lowers within the chamber 18, the valve opens to allow gas to escape from the chamber 18. This results in the rise of fluid in the chamber 18. The valve 38 may be set to maintain the level of fluid in the chamber at a predetermined level 48.

The arrangement is such that as fluid flows into the chamber 18 through the inlet 16 and out of the chamber 18 through the outlet 20, relatively large and buoyant air pockets present in the fluid in the chamber 18 tend to rise to the surface 48 of the fluid. It is well known, however, that smaller "micro" gas pockets which are present in the fluid maintain their presence in the fluid as it flows from the inlet 16 into the chamber 18 and through the outlet 20, i.e., they do not rise to the surface. These micro gas pockets have a tendency to combine with one another to form larger gas pockets which produce the undesirable effects described above. The uncombined micro gas pockets also contain oxygen which produces corrosion of the pipes. Thus, it is desirable to remove the micro gas pockets as well.

Still referring to FIGS. 1–3, the de-aerator apparatus 10 of the present invention further comprises a device embodying a brush, generally designated at 50, for rapidly merging micro gas pockets in the fluid with the large gas pockets which because of their buoyancy, rise to the surface of the fluid within the chamber 18. As illustrated, the brush 50 is disposed in the chamber 18 of the housing 12 and includes a clamping member 52 having a plurality of twisted strands of wires, and a plurality of wire bristles 52 which extend radially outwardly from the clamping member 52 and are secured to the clamping member 52 in such a manner that the bristles 54 vibrate when fluid flows through the inlet 16 into the chamber 18. The bristles 54 tend to vibrate due to the force of the fluid flowing through the bristles 54 and due to their construction, i.e., length to diameter ratio of seventy-five to one, or higher. The bristles 54 facing the flow of fluid, i.e., the bristles 54 which extend in a direction generally parallel to the flow of fluid into the chamber 18 from the inlet 16, are particularly adapted to merge micro gas pockets with one another to produce the large gas pockets. The vibrating action of the bristles 54 quickens the merging of the micro gas pockets for effectively removing gas from the fluid.

Referring particularly to FIG. 3, the diameter of the brush 50 generally corresponds to the diameter of the cylindrical wall 14 in such a manner that it has a slight interference fit therewith for preventing the rotation of the brush 50 within the chamber 18. Also, the bristles 54 of the brush 50 extend along the length of the clamping member 52 a distance generally corresponding to the distance between the lower and upper seats 30, 32. The bristles 54 at the lower end of the brush 50 engage the lower seat 30 for supporting the brush 50 within the chamber 18 such that a portion of the bristles 54 of the brush 50 engage the flow of water as it enters the chamber 18 from the inlet 16 and the brush 50 is prevented from entering the lower reduced diameter portion 26. Similarly, the bristles 54 at the upper end of the brush 50 engage the upper seat 32 for preventing the brush 50 from entering the portion of the chamber 18 defined by the reduced diameter portion 28.

Figure 4:
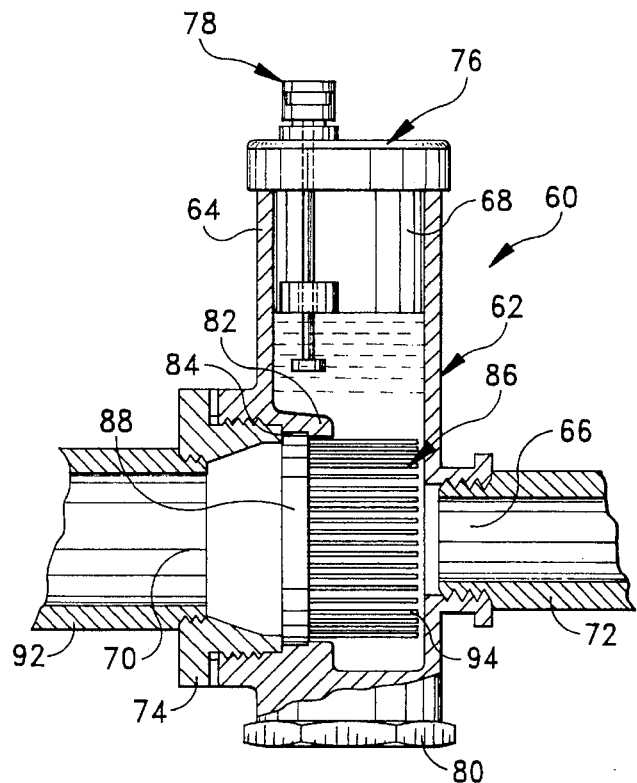
FIG. 4 is a cross section elevational view of a de-aerator apparatus of a second preferred embodiment.
Figures 5, 6:
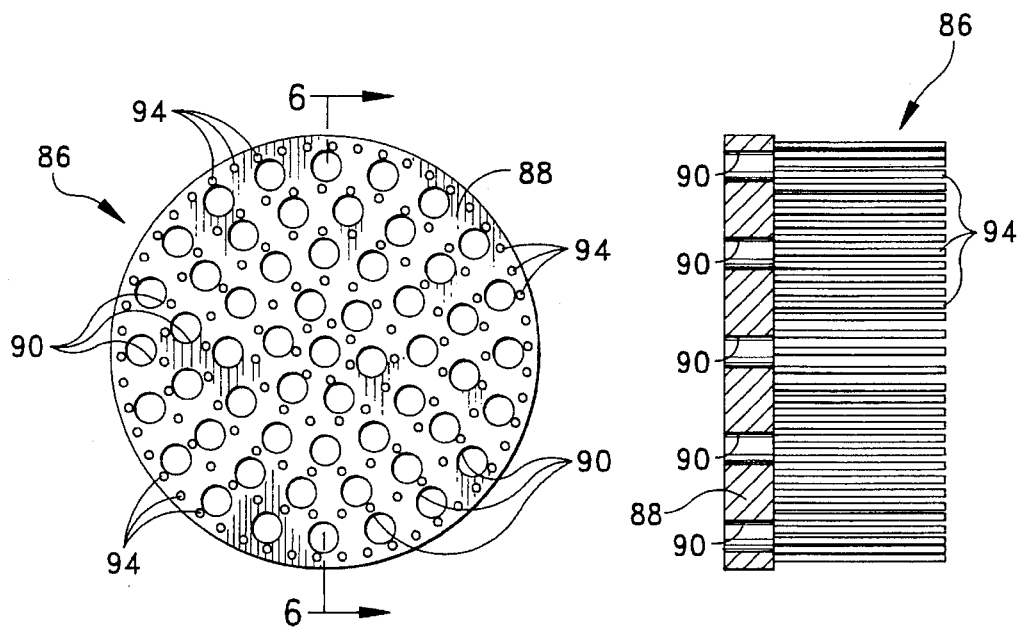
FIG. 5 is an elevational view of a brush of the de-aerator apparatus of the second preferred embodiment.
FIG. 6 is a cross-sectional view taken along line 6—6 of FIG. 5.

Referring now to FIGS. 4–6 and more particularly to FIG. 4, there is indicated generally at 60 a de-aerator apparatus of a second preferred embodiment. As illustrated, the de-aerator apparatus 60 of the second preferred embodiment comprises a housing; generally indicated at 62, having a cylindrical wall 64 preferably fabricated from bronze or stainless steel. Formed in the wall 64 is an inlet 66 for allowing the passage of fluid into a chamber 68 of the housing 62 and an outlet 70 having a larger diameter than the inlet 66 for discharging fluid from the chamber 68. The inlet and outlet 66, 70 are internally threaded, the inlet 66 receiving an inlet pipe 72 and the outlet 70 receiving a retaining ring 74 which will be described in greater detail below. The cylindrical wall 64 extends in a direction generally transverse to the direction of flow of fluid between the inlet 66 and the outlet 70.

As with apparatus 10, the upper end of the housing 62 of apparatus 60 is externally threaded for receiving a cap, generally indicated at 76, for sealing the open top of the housing 62. The cap 76 also includes a vent embodying a valve, generally indicated at 78, identical to vent 38, for venting gas (e.g., air) from the chamber 68. A bottom wall 80 seals the bottom of the housing 62, the bottom wall 80 having an outer surface the shape of a hexagon for turning the housing with a tool, such as a pipe wrench, if necessary.

The cylindrical wall 64 of the housing 62 includes an annular portion 82 formed around the outlet 70 which extends interiorly within the chamber 68. The annular portion 82 defines a seat 84 formed in the wall 64 around the outlet 70 for receiving a device, generally designated at 86, for merging the micro gas pockets present in the fluid with one another to produce the large gas pockets which rise to the surface of the fluid within the chamber. As illustrated, the device 86 comprises a base 88 which is received in the seat 84 and secured therein by the retaining ring 74. The base 88 of the device is situated in the chamber of the housing such that it faces the flow of fluid entering the chamber from the inlet. As illustrated in FIG. 5, the base 88 has a plurality of openings 90 formed therein for allowing fluid to be exhausted from the outlet 70 to an outlet pipe 92 threadably secured to the retaining ring 74.

The device 86 further includes a plurality of wire bristles 94 which extend perpendicularly with respect to the base 88 towards the flow of fluid entering the chamber 68. Referring particularly to FIG. 4, the diameter of the device 86 is slightly larger than the diameter of the inlet 66 for ensuring that the fluid flowing into the chamber 68 through the inlet 66 engages the vibrating bristles 94 of the device 86. The bristles 94 are adapted to vibrate when fluid flows through the inlet 66 into the chamber 68 due to the force of the fluid flowing through the bristles 94 and due to their attachment to the base 88. Like the bristles 54 of the brush 50 of apparatus 10, the bristles 94 of device 86 are particularly adapted to merge micro gas pockets.

It should be noted that the de-aerator apparatus (10 and 60) of the present invention merges micro gas pockets with one another to produce relatively large gas pockets due to the dynamic action of the vibrating bristles (54 and 94) which agitate the water. It is this dynamic action that makes the de-aerator apparatus (10 and 60) of the present invention particularly effective in removing gas from the fluid.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A de-aerator apparatus for removing gas from fluid flowing through a pipe, the de-aerator apparatus comprising:

a housing having a chamber, an inlet connected to an inlet pipe for allowing the passage of fluid into the chamber, an outlet connected to an outlet pipe for discharging fluid from the chamber, and a vent for venting gas from the top of the chamber, the arrangement being such that as fluid flows into the chamber through the inlet and out of the chamber through the outlet, relatively large gas pockets present in the fluid in the chamber rise to the surface of the fluid and exit the chamber through the vent; and a device positioned within the chamber, said device having bristles facing the flow of fluid into the chamber through the inlet, the bristles vibrating for merging micro gas pockets present in the fluid with other micro gas pockets for forming large gas pockets which rise to the surface of the fluid within the chamber and exit the chamber through the vent.

2. The apparatus as set forth in claim 1, said housing further having a cylindrical wall extending in a direction generally transverse to the direction of the flow of fluid between the inlet and the outlet.

3. The apparatus as set forth in claim 2, said housing further having a seat formed in the cylindrical wall for receiving the device therein within the chamber.

4. The apparatus as set forth in claim 3, said seat being formed in the cylindrical wall around the circumference of said wall.

5. The apparatus as set forth in claim 4, said housing further comprising a second seat spaced from and facing the first seat.

6. The apparatus as set forth in claim 5, said device comprising a brush having an elongate clamping member which extends in a direction co-axial with the wall of the housing, said bristles extending radially outwardly from the clamping member and being secured to the clamping member in such a manner that the bristles vibrate when fluid flows through the inlet into the chamber.

7. The apparatus as set forth in claim 6, said bristles extending along the length of the clamping member a distance substantially equal to the distance between the seats.

8. The apparatus as set forth in claim 6, said brush having a diameter substantially equal to the diameter of the cylindrical wall.

9. The apparatus as set forth in claim 3, said seat being formed in the cylindrical wall.

10. The apparatus as set forth in claim 9, said device comprising a base which is received by the seat, said base substantially facing the flow of fluid entering the chamber through the inlet, said base having openings formed therein for allowing fluid to flow through the outlet.

11. The apparatus as set forth in claim 10, said bristles extending towards the flow of fluid entering the chamber through the inlet and being secured to the base in such a manner that the bristles vibrate when fluid flows through the inlet into the chamber.

12. The apparatus as set forth in claim 1, said bristles being made from long, thin wire.

13. The apparatus as set forth in claim 1, said vent comprising a valve.

14. The apparatus as set forth in claim 1, said housing further having a removable plug for accessing and permitting cleaning of the chamber of the housing.

\* \* \* \* \*